(12) United States Patent
Wang et al.

(10) Patent No.: US 11,209,565 B2
(45) Date of Patent: Dec. 28, 2021

(54) HIGH PRECISION ACOUSTIC LOGGING PROCESSING FOR COMPRESSIONAL AND SHEAR SLOWNESS

(71) Applicant: HALLIBURTON ENERGY SERVICES, INC., Houston, TX (US)

(72) Inventors: Ruijia Wang, Singapore (SG); Chung Chang, Houston, TX (US); Kristoffer Thomas Walker, Kingwood, TX (US); Baichun Sun, Perth (AU)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 239 days.

(21) Appl. No.: 16/068,942

(22) PCT Filed: Mar. 28, 2017

(86) PCT No.: PCT/US2017/024571
§ 371 (c)(1),
(2) Date: Jul. 10, 2018

(87) PCT Pub. No.: WO2017/172792
PCT Pub. Date: Oct. 5, 2017

(65) Prior Publication Data
US 2019/0018161 A1    Jan. 17, 2019

Related U.S. Application Data

(60) Provisional application No. 62/317,187, filed on Apr. 1, 2016.

(51) Int. Cl.
*G01V 1/50* (2006.01)
*G01V 1/46* (2006.01)
(Continued)

(52) U.S. Cl.
CPC ............. *G01V 1/50* (2013.01); *G01V 1/303* (2013.01); *G01V 1/46* (2013.01); *G01V 1/286* (2013.01);
(Continued)

(58) Field of Classification Search
CPC ........... G01V 1/50; G01V 1/303; G01V 1/46; G01V 2210/1429; G01V 2210/1299;
(Continued)

(56) References Cited

U.S. PATENT DOCUMENTS 4,698,793 A * 10/1987 Wu ................. G01V 1/48
  367/28
6,477,112 B1 * 11/2002 Tang ............... G01V 1/48
  367/38
(Continued)

OTHER PUBLICATIONS

Definition of semblance, Oilfield Glossary, printed Oct. 5, 2020. (Year: 2020).*
(Continued)

*Primary Examiner* — Michael P Nghiem
(74) *Attorney, Agent, or Firm* — Polsinelli PC

(57) ABSTRACT

Disclosed are systems and methods for high precision acoustic logging processing for compressional and shear slowness. The method comprises measuring, by a sonic logging tool, sonic data associated with a formation within a borehole, attempting a detection of a first arrival within the sonic data determining whether the attempted detection of the first arrival is accurate, and in response to an accurate detection of the first arrival determining a travel time of the first arrival, generating a coherence map including the first arrival, and determining, based on the coherence map, a characteristic of the formation.

20 Claims, 14 Drawing Sheets

(51) Int. Cl.
*G01V 1/30* (2006.01)
*G01V 1/32* (2006.01)
*G01V 1/28* (2006.01)

(52) U.S. Cl.
CPC ...... *G01V 1/325* (2013.01); *G01V 2210/1299* (2013.01); *G01V 2210/1429* (2013.01); *G01V 2210/22* (2013.01); *G01V 2210/3246* (2013.01); *G01V 2210/41* (2013.01); *G01V 2210/47* (2013.01); *G01V 2210/6222* (2013.01); *G01V 2210/74* (2013.01)

(58) Field of Classification Search
CPC ....... G01V 2210/22; G01V 2210/6222; G01V 2210/3246; G01V 2210/41; G01V 2210/47; G01V 2210/74; G01V 1/325; G01V 1/286; G01V 1/48; G01V 1/282; E21B 47/00
USPC ............................................................ 702/6
See application file for complete search history.

(56) References Cited

U.S. PATENT DOCUMENTS

| | | | |
|---|---|---|---|
| 2007/0153628 A1* | 7/2007 | Mathiszik | G01V 1/42 367/57 |
| 2008/0027650 A1* | 1/2008 | Huang | G01V 1/48 702/13 |
| 2008/0123468 A1* | 5/2008 | Akhmetsafin | G01V 1/48 367/25 |
| 2008/0285382 A1 | 11/2008 | Valero et al. | |
| 2008/0291780 A1* | 11/2008 | Basaki | G01V 1/48 367/27 |
| 2012/0127827 A1 | 5/2012 | Underhill et al. | |
| 2018/0106142 A1* | 4/2018 | Nguyen | E21B 44/00 |
| 2019/0113639 A1* | 4/2019 | Khadhraoui | G01V 1/48 |
| 2019/0257971 A1* | 8/2019 | Wang | G01V 1/50 |
| 2019/0293823 A1* | 9/2019 | Sun | G01V 1/303 |

OTHER PUBLICATIONS

International Search Report and Written Opinion; PCT Application No. PCT/US2017/024571; dated Mar. 28, 2017.

* cited by examiner

HIGH PRECISION ACOUSTIC LOGGING PROCESSING FOR COMPRESSIONAL AND SHEAR SLOWNESS

CROSS-REFERENCE

The present application claims the benefit of U.S. Provisional Application No. 62/317,187, filed Apr. 1, 2016, which is hereby incorporated by reference in its entirety.

This application is a national stage entry of PCT/US2017/024571 filed Mar. 28, 2017, said application is expressly incorporated herein in its entirety.

TECHNICAL FIELD

The present disclosure pertains to the processing of acoustic logging, and more specifically to techniques for high precision acoustic logging processing for compressional and shear slowness.

BACKGROUND

The quality of answers in acoustic logging processes are strongly influenced by the complicated nature of borehole environments. For example, extremely low signal-to-noise ratio (SNR), interactions between P-wave signals and leaky-P-wave signals, and multiple modes (P-waves, S-waves, leaky-P-waves, Stoneley waves, noise waves, etc.) all affect the waveforms measured during acoustic logging and make it difficult to separate and identify individual waveform modes using conventional coherence processing methods. These same difficulties make it challenging to accurately evaluate both the compressional and shear slowness automatically, and the situation becomes even more challenging for real-time processing compared to post-processing efforts as there is very little human interaction and computing time in between continuous acquisition intervals. With traditional processing methods, the wrong borehole modes are often processed, as algorithms in such methods struggle to distinguish between desired and undesired borehole modes present in the waveforms. This results in low-quality and unreliable slowness answers. Accordingly, there is a need to provide a fast, self-adaptive, and reliable acoustic logging process which is suitable for both real-time and post-logging processing.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
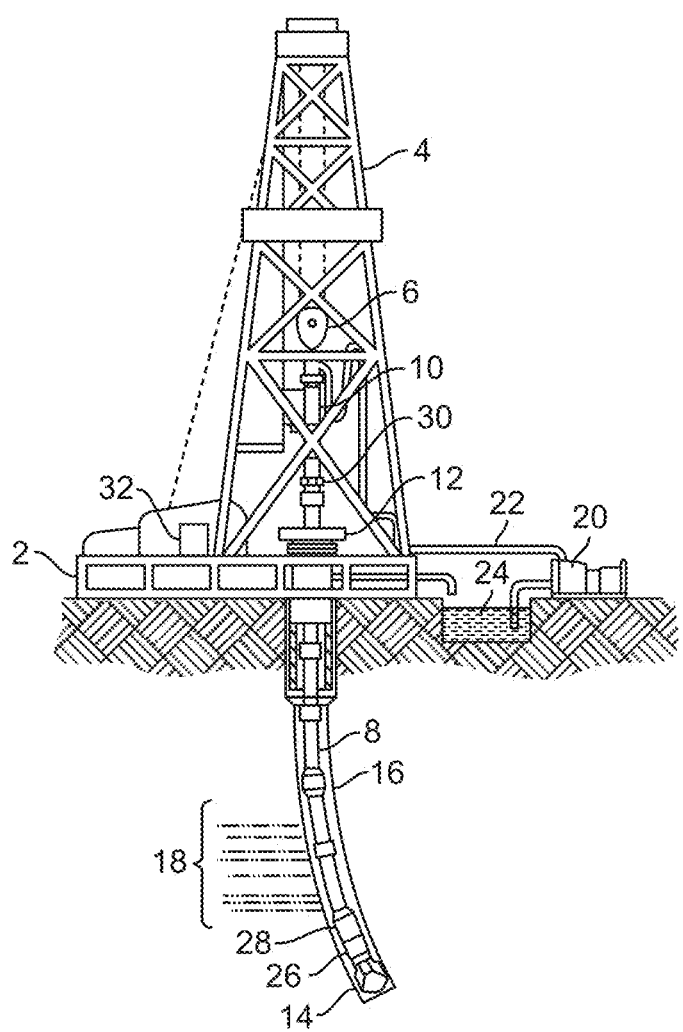
FIG. 1A illustrates a schematic diagram of an example logging-while-drilling (LWD) environment.

Various embodiments of the disclosure are described in detail below. While specific implementations are described, it should be understood that this is done for illustration purposes only. Other components and configurations may be used without parting from the spirit and scope of the disclosure. Moreover, it should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

The present disclosure provides for a fast, self-adaptive, and reliable acoustic logging process which is suitable for both real-time and post-logging processing. The techniques set forth herein are able to extract the correct and accurate compressional (DTC) and shear slowness (DTRS) logs, even when the influence of leaky-P and other dispersive borehole modes are present by utilizing a well-engineered algorithm and a robust work-flow. This may be carried out by providing for first arrival detection and tracking to locate of refracted P-waves. Due to the fact that these refracted P-waves arrive first, there is little contamination from other waves in the borehole, and have reduced noise levels. Accordingly, this leads to a more accurate and reliable P-wave slowness determination, and further from this, a shear wave slowness extraction. If the initial first arrival detection attempt and tracking is inaccurate or incomplete, the travel time of the P-wave may be estimated. If this secondary estimation attempt is also inaccurate, then a more conventional and larger time window may be applied for detecting the arriving P-waves. From these data, a semblance method may be applied, and the compressional slowness may be obtained and shear slowness picking extracted.

The disclosure now turns to FIGS. 1A-B and 2A-B to provide a brief introductory description of the larger systems and computing devices which can be employed to practice the concepts, methods, and techniques disclosed herein. A more detailed description of the presently disclosed high precision acoustic logging processing for compressional and shear slowness will then follow.

FIG. 1A shows an illustrative logging while drilling (LWD) environment. A drilling platform 2 supports a derrick 4 having a traveling block 6 for raising and lowering a drill string 8. A kelly 10 supports drill string 8 as it is lowered through a rotary table 12. A drill bit 14 is driven by a downhole motor and/or rotation of drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into pit 24 and aids in maintaining the borehole integrity.

A downhole tool 26, such as a sonic logging tool, can be integrated into the bottom-hole assembly near bit 14. As the bit extends the borehole through the formations, the bottom-hole assembly collects sonic logging data. Tool 26 may take the form of a drill collar (i.e., a thick-walled tubular that provides weight and rigidity to aid the drilling process) or other arrangements known in the art. Further, downhole tool 26 may include acoustic (e.g., sonic, ultrasonic, etc.) logging tools and/or corresponding components, integrated into the bottom-hole assembly near bit 14. In this fashion, as bit 14 extends the borehole through formations, the bottom-hole assembly (e.g., the acoustic logging tool) can collect acoustic logging data. For example acoustic logging tools can include transmitters (e.g., monopole, dipole, quadrupole, etc.) to generate and transmit acoustic signals/waves into the borehole environment. These acoustic signals subsequently propagate in and along the borehole and surrounding formation and create acoustic signal responses or waveforms, which are received/recorded by evenly spaced receivers. These receivers may be arranged in an array and may be evenly spaced apart to facilitate capturing and processing acoustic response signals at specific intervals. The acoustic response signals are further analyzed to determine borehole and adjacent formation properties and/or characteristics.

For purposes of communication, a downhole telemetry sub 28 can be included in the bottom-hole assembly to transfer measurement data to a surface receiver 30 and to receive commands from the surface. Mud pulse telemetry is one common telemetry technique for transferring tool measurements to surface receivers and receiving commands from the surface, but other telemetry techniques can also be used. In some embodiments, telemetry sub 28 can store logging data for later retrieval at the surface when the logging assembly is recovered.

At the surface, surface receiver 30 can receive the uplink signal from the downhole telemetry sub 28 and can communicate the signal to a data acquisition module 32. Module 32 can include one or more processors, storage mediums, input devices, output devices, software, and the like as described in detail in FIGS. 2A and 2B. Module 32 can collect, store, and/or process the data received, via the drilling platform 2, from tool 26 as described herein.

Figure 1B:
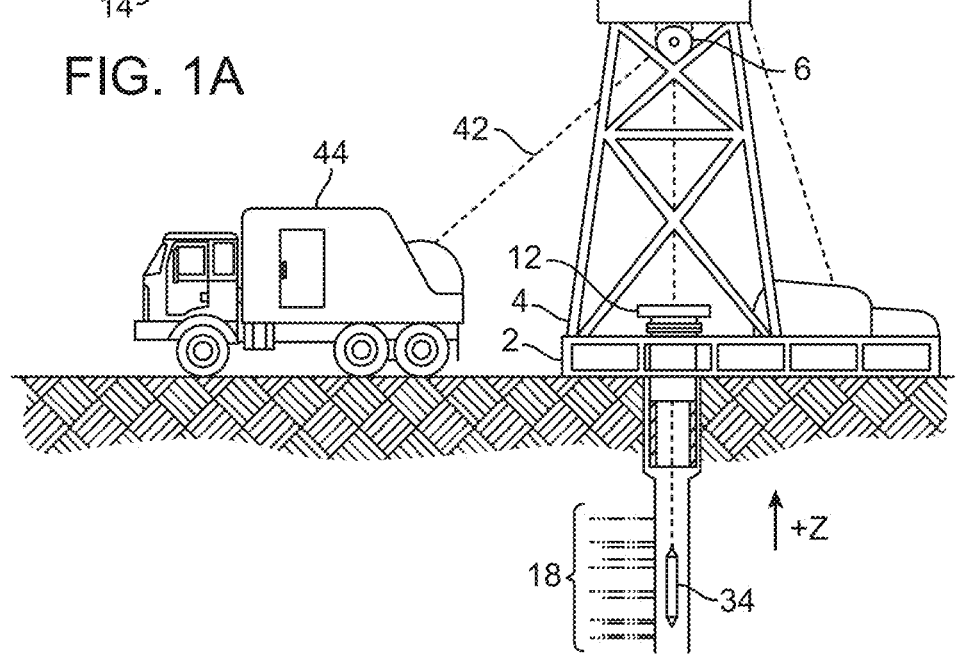
FIG. 1B illustrates a schematic diagram of an example wireline logging environment.

At various times during the drilling process, the drill string 8 may be removed from the borehole as shown in FIG. 1B. Once drill string 8 has been removed, logging operations can be conducted using a downhole tool 34 (i.e., a sensing instrument sonde) suspended by a conveyance 42. In one or more embodiments, the conveyance 42 can be a cable having conductors for transporting power to the tool and telemetry from the tool to the surface). Downhole tool 34 may have pads and/or centralizing springs to maintain the tool near the central axis of the borehole or to bias the tool towards the borehole wall as the tool is moved downhole or uphole.

Downhole tool 34 can include an acoustic or sonic logging instrument that collects acoustic logging data within the borehole 16. A logging facility 44 includes a computer system, such as those described with reference to FIGS. 2A and 2B, for collecting, storing, and/or processing the measurements gathered by logging tool 34. In one or more embodiments, the conveyance 42 of the downhole tool 34 may be at least one of wires, conductive or non-conductive cable (e.g., slickline, etc.), as well as tubular conveyances, such as coiled tubing, pipe string, or downhole tractor. The downhole tool 34 may have a local power supply, such as batteries, downhole generator and the like. When employing non-conductive cable, coiled tubing, pipe string, or downhole tractor, communication may be supported using, for example, wireless protocols (e.g. EM, acoustic, etc.), and/or measurements and logging data may be stored in local memory for subsequent retrieval.

Although FIGS. 1A and 1B depict specific borehole configurations, it should be understood that the present disclosure is equally well suited for use in wellbores having other orientations including vertical wellbores, horizontal wellbores, slanted wellbores, multilateral wellbores and the like. While FIGS. 1A and 1B depict an onshore operation, it should also be understood that the present disclosure is equally well suited for use in offshore operations. Moreover, the present disclosure is not limited to the environments depicted in FIGS. 1A and 1B, and can also be used, for example, in other well operations such as production tubing operations, jointed tubing operations, coiled tubing operations, combinations thereof, and the like.

Figure 2A:
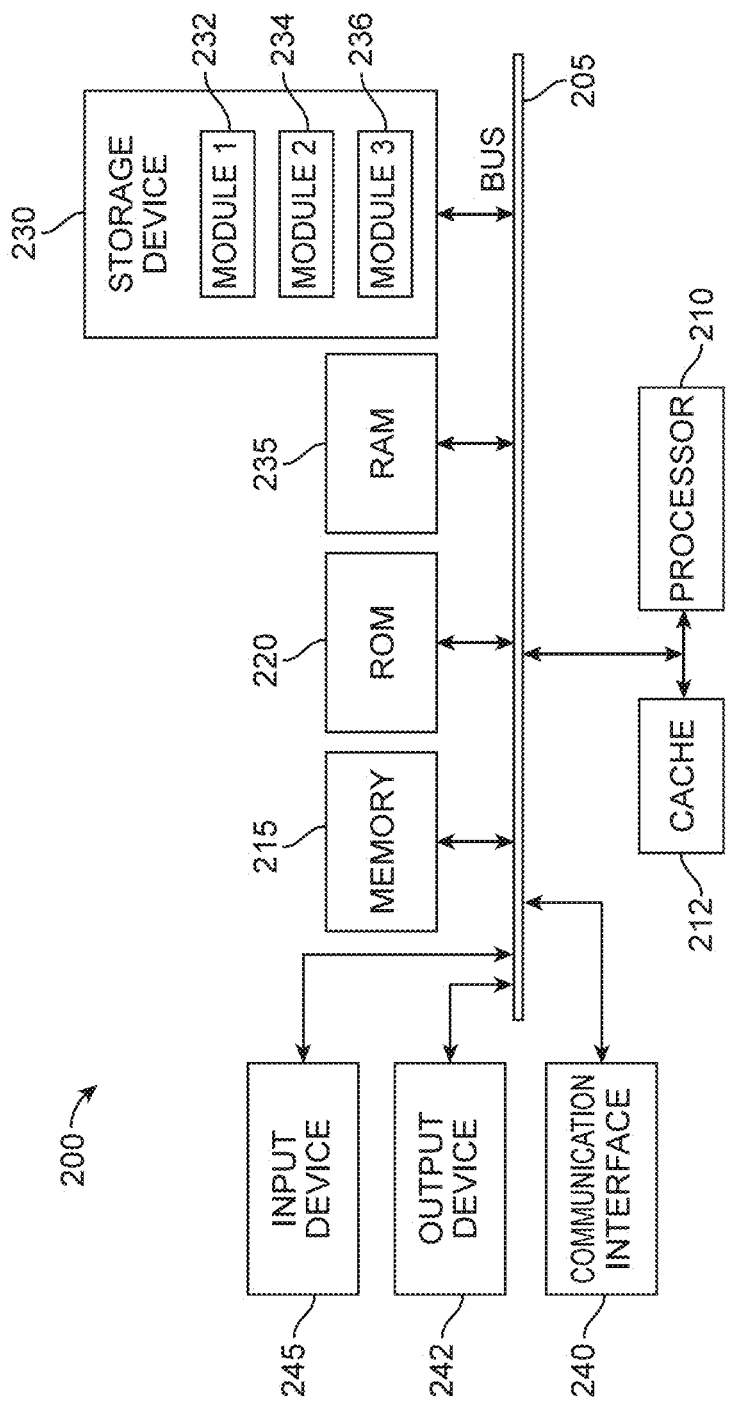
FIGS. 2A and 2B illustrate schematic diagrams of example system embodiments.
Figure 2B:
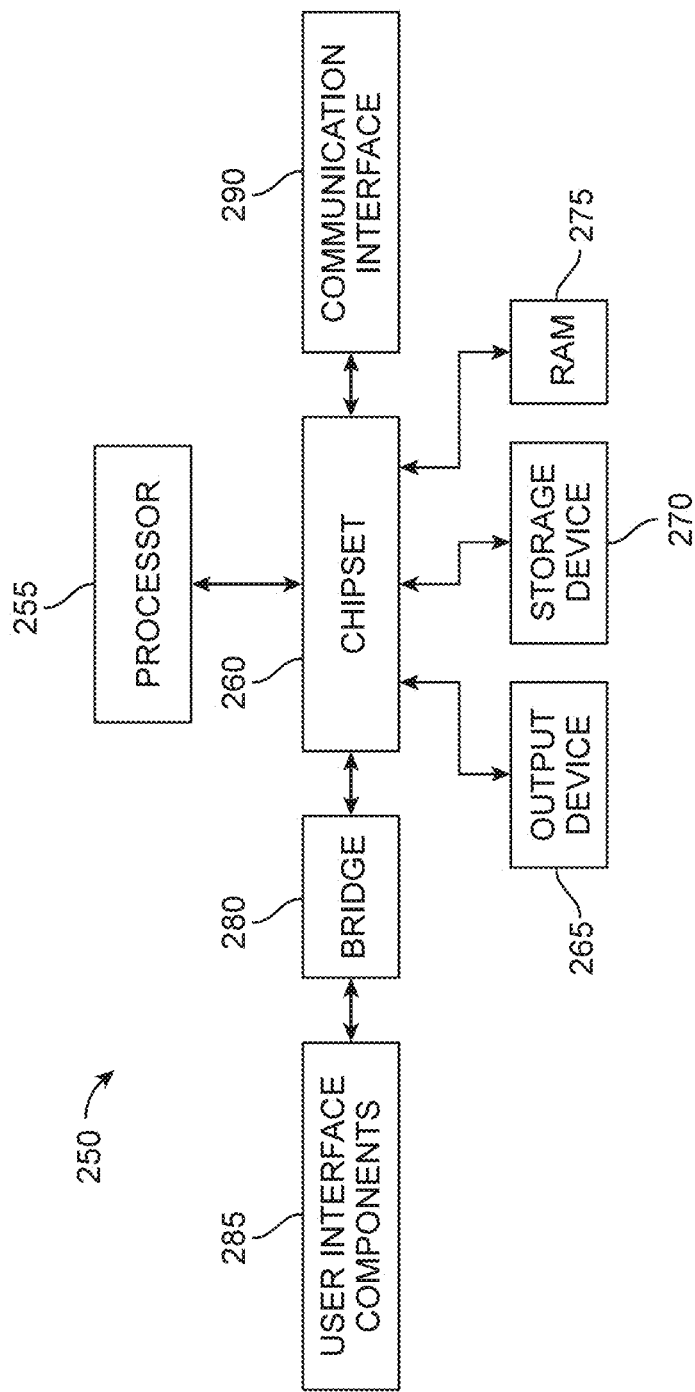

FIGS. 2A and 2B illustrate exemplary computing systems for use with example tools and systems (e.g., downhole tool 26, downhole tool 34, surface equipment, and the like). The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. System 200 can include a processing unit (CPU or processor) 210 and a system bus 205 that couples various system components including the system memory 215, such as read only memory (ROM) 220 and random access memory (RAM) 235, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 (232), module 2 (234), and module 3 (236) stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 242 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 235, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, output device 242, and so forth, to carry out the function.

FIG. 2B illustrates an example computer system 250 having a chipset architecture that can be used in executing the described method and generating and displaying a graphical user interface (GUI). Computer system 250 can be computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. Chipset 260 can output information to output device 265, such as a display, and can read and write information to storage device 270, which can include magnetic media, and solid state media. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that systems 200 and 250 can have more than one processor 210 or be part of a group or cluster of computing devices networked together to provide greater processing capability.

There are several acoustic guided waves that exist in a fluid-filled borehole. For example, a monopole source can excite a borehole refracted P-wave, a borehole refracted S-wave, pseudo-Rayleigh waves of different orders and Stoneley waves if it is in a fast formation borehole. A monopole source may generate a refracted P-wave, a leaky-P-wave and Stoneley waves in a slow formation borehole. A dipole source may excite a borehole refracted P-wave, a borehole refracted S-wave, and flexural waves of different orders if it is in a fast formation borehole. These waves propagate along the borehole axis and are all borehole guided waves. Among all the guided waves, borehole refracted P- and S-waves propagate along the borehole axis with the speed of formation body waves, and therefore these two types of waves are used to extract formation compressional and shear slowness.

There are two sets of acoustic logging processing methods that are used by most modern acoustic logging tools. One set are time-domain methods, and the others are frequency-domain methods. Because time domain processing methods usually provide better signal separation than frequency domain methods, they are the preferred method for non-dispersive wave processing, such as the extraction of P-wave and S-wave formation speeds. The processing steps of the time-domain methods (Slowness time coherence (STC), the Differential Phase Time Semblance (DPTS) and Nth-Root) begin by computing a 2D (slowness-time) coherence or phase difference semblance map in the time-slowness domain with time-slowness constraint parameters. Then, the P- or S-slowness is selected from the different peaks inside the 2D semblance map. These peaks (local maximums or minimums) represent all possible guided waves or borehole refractions that propagate along the borehole axis.

Figure 3:
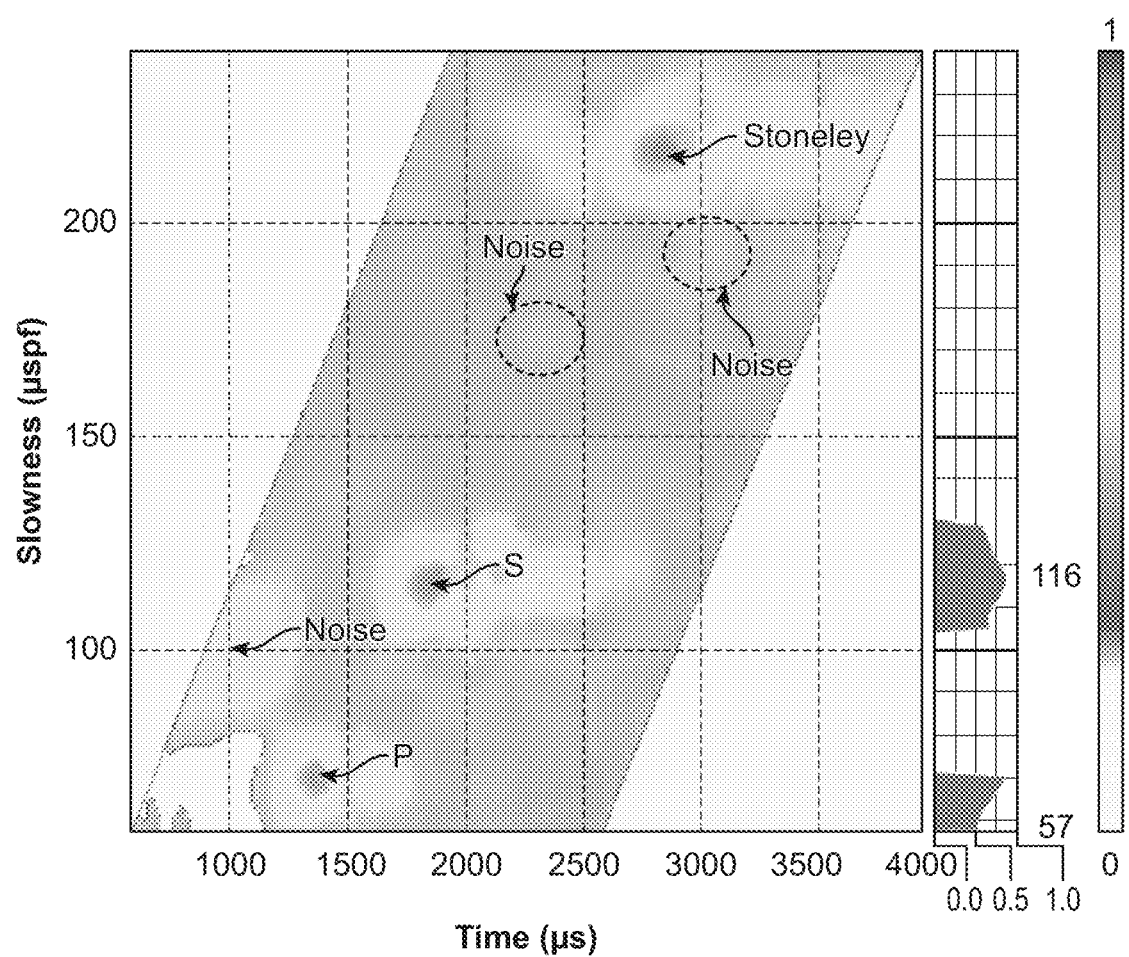
FIG. 3 is a graphical representation of a 2D slowness-time semblance map for a hard formation borehole.

FIG. 3 shows an example 2D phase difference semblance map for monopole waveforms acquired in a typical hard formation borehole generated by the DPTS method. There are several peaks that represent P-waves, S-waves, Stoneley waves, and noise. For the case with consistent borehole diameter, the peaks generated by noise have smaller coherence values and can be easily removed by using a fixed minimum coherence threshold. However, for the case with bad borehole conditions, the signal peak values for guided waves may decrease to the point where they are in the same order of magnitude as the noise peaks. In such cases, picking the correct peak is challenging. In addition, for some complicated formations, if the transmitters are not modally pure, or if the tool is not centered in a symmetric borehole, both monopole guided waves and dipole guided waves can be observed in the 2D semblance map, which makes it even more difficult to pick the correct compressional and shear waves.

Figure 4:
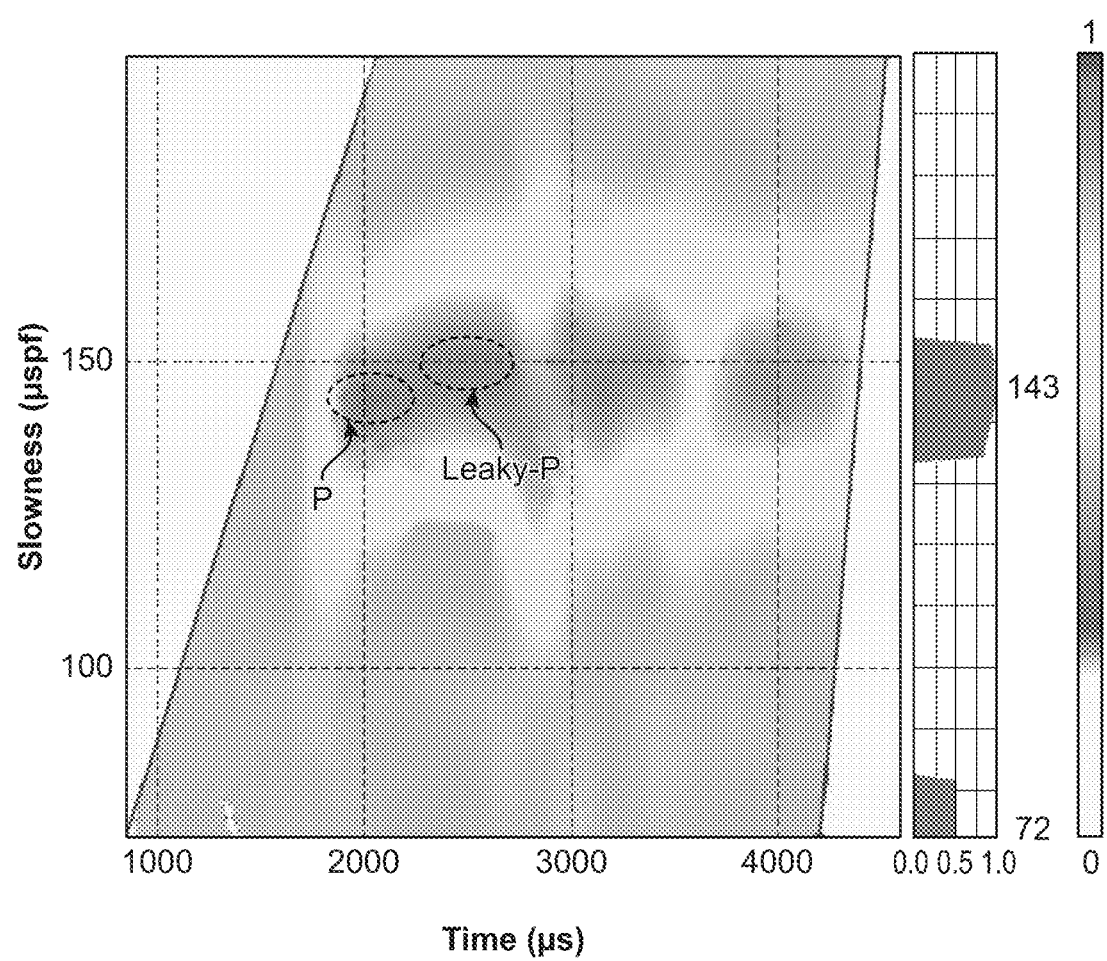
FIG. 4 is a graphical representation of a 2D slowness-time semblance map for a soft formation borehole

A more commonly observed challenge is the extraction of compressional slowness from borehole monopole acoustic measurements in soft formations. In soft formation boreholes, monopole source excites P waves and leaky-P waves simultaneously. Because the P-waves and leaky-P-waves have very similar propagation speeds, it is difficult to automatically distinguish these two competing types of waves inside the 2D semblance map. For example, FIG. 4 shows the 2D differential phase semblance map for a soft formation case. The P-arrival is close in time to the leaky-P-arrival, and has only a slightly lower slowness value, making it difficult to distinguish between the two types of waves in most borehole conditions.

Figure 5:
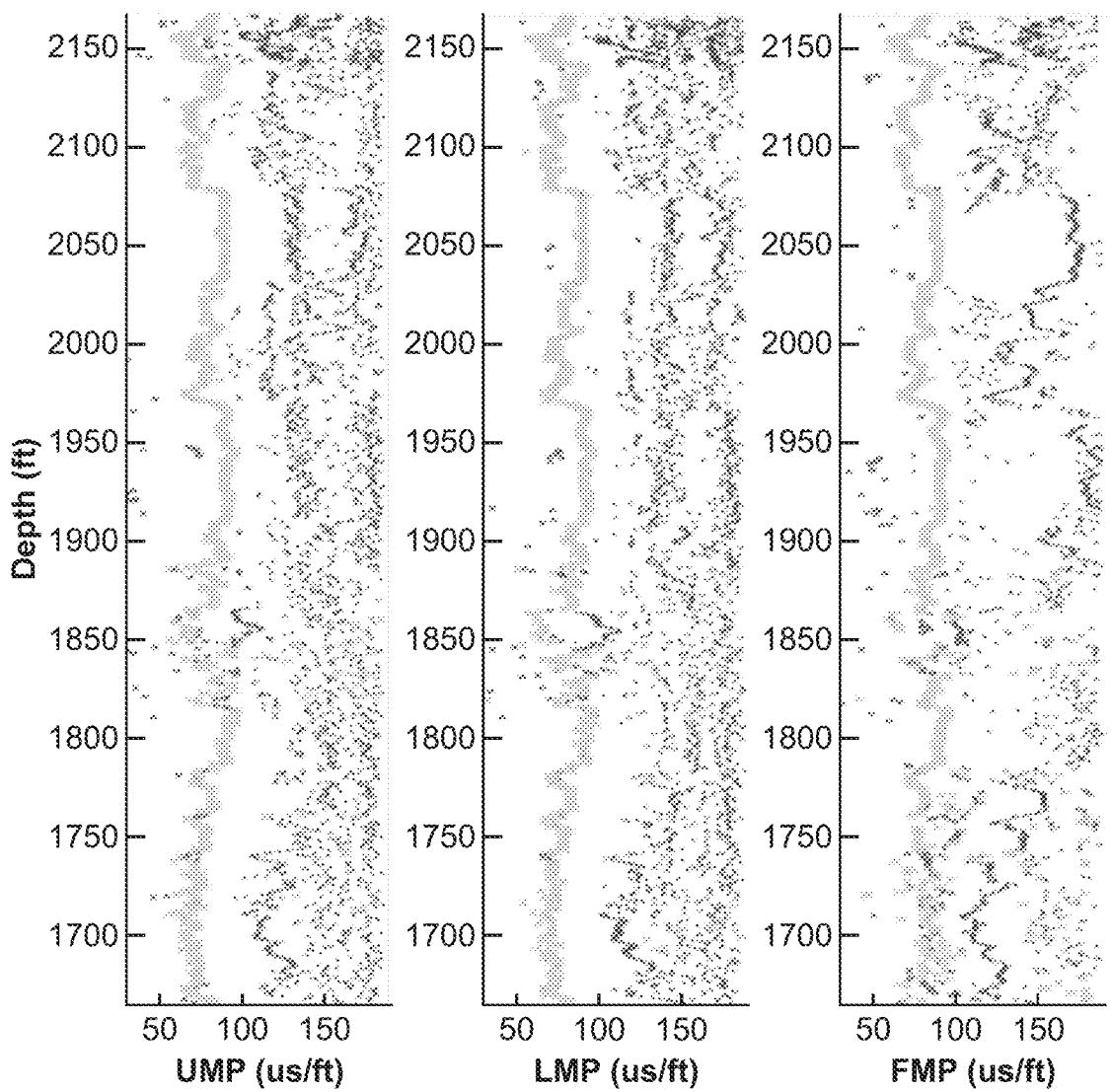
FIG. 5 is a graphical representation of peaks extracted from a 2D semblance map.

FIG. 5 shows semblance peaks at different depths, where the semblance peaks have been computed by a Differential Phase Time Semblance (DPTS) technique and extracted by a 2D map picking algorithm. It is clear from the figure that there are many qualified peaks which make it difficult to identify the correct peaks representing the true compressional and shear slowness without introducing extra constraints. Computing a large 2D coherence or phase difference map is also time consuming and inefficient.

In light of the above-noted difficulties, the present disclosure provides a new process work-flow that includes a novel first-motion detection technique to help in the determination of the P-slowness and shear slowness. The process is based on the fact that the borehole refracted P-wave is always the first wave to arrive using well engineered acoustic tools regardless of an open hole or a cased hole with good cement bonding conditions. Given this fact, the first arrival-detection scheme is able to narrow down the time-search window before the processing algorithm goes into the calculation of the array time coherence map. With this first-arrival detection technique, the compressional refraction will be identified in time, and its slowness will be estimated using semblance. In addition, there is little contamination from the reflected waves and other borehole modes because they typically arrival later in time. Therefore, the first arriving P-wave has a much higher signal-to-noise ratio (SNR) than the later arriving and interfering modes. The presently disclosed process is also able to remove other unrelated coherent noise peaks that exist in the 2D time coherence map. Thus, the proposed process is able to provide more reliable and accurate DTC logs than possible with a conventional 2D time coherence computation and picking algorithm.

Figure 6:
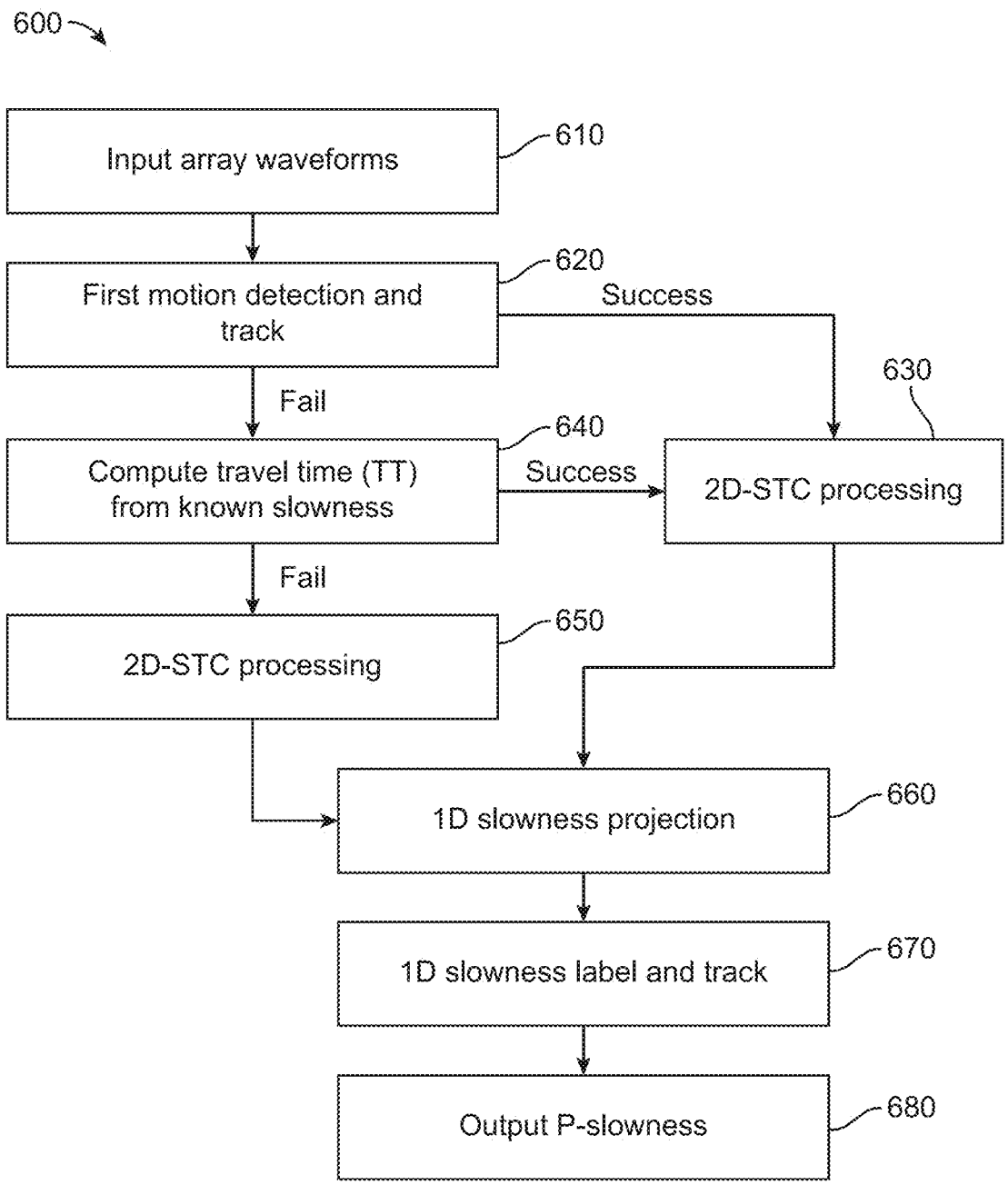
FIG. 6 illustrates an exemplary work-flow for monopole P-slowness processing in accordance with the present disclosure.

FIG. 6 shows the process work-flow 600 for extracting compressional slowness from the received monopole waveforms. First, in step 610 the monopole array waveforms are obtained by downhole sensors. Next, in step 620, a first motion detection and tracking method can be applied in order to attempt to locate the first arrival in the waveforms, which is always the P-wave. If the first arrival is accurately, or successfully, determined, as shown in step 630, a narrow 2-D semblance time window that spans the first arriving P-wave energy can be adopted. Although an STC semblance method is mentioned, any semblance method may be employed, and can include point-to-point methods such as stacking or DPTS within the narrow 2-D window, or may also include time-window based methods such as STC or N-th root. Time semblance methods effectively average slowness over a narrow time window, which implicitly limits their slowness accuracy. This narrow time window provides a higher quality P-slowness estimation, as the first arriving P-waves are less affected by the reflected and scattered waves.

If the first motion detection technique fails to detect the first arrival, or inaccurately detects the first arrival, then the known slowness at neighboring formation depths near the transmitter may be used in an attempt to compute and predict the travel time of P-waves. In at least this embodiment, such a method assumes that the acoustic tool is in an up logging mode, as shown in step 640. The obtained travel time of P-waves provides a reliable starting time window for the semblance calculation as in step 640. However, if the algorithm fails to provide a Travel Time (TT), as shown in step 650, a time window for the coherence processing can be used. In any case, both steps 630 and 650 proceed to step 660, wherein the coherence map will be projected to the slowness axis, resulting in a 1-D coherence Variable Density Log (VDL). A 1D slowness labeling and tracking algorithm can then be used to pick the P-slowness from the 1D slowness coherence map as shown in step 670. Finally, as in step 680, the P-slowness will be output as the final answer from the picking algorithm.

Figure 7:
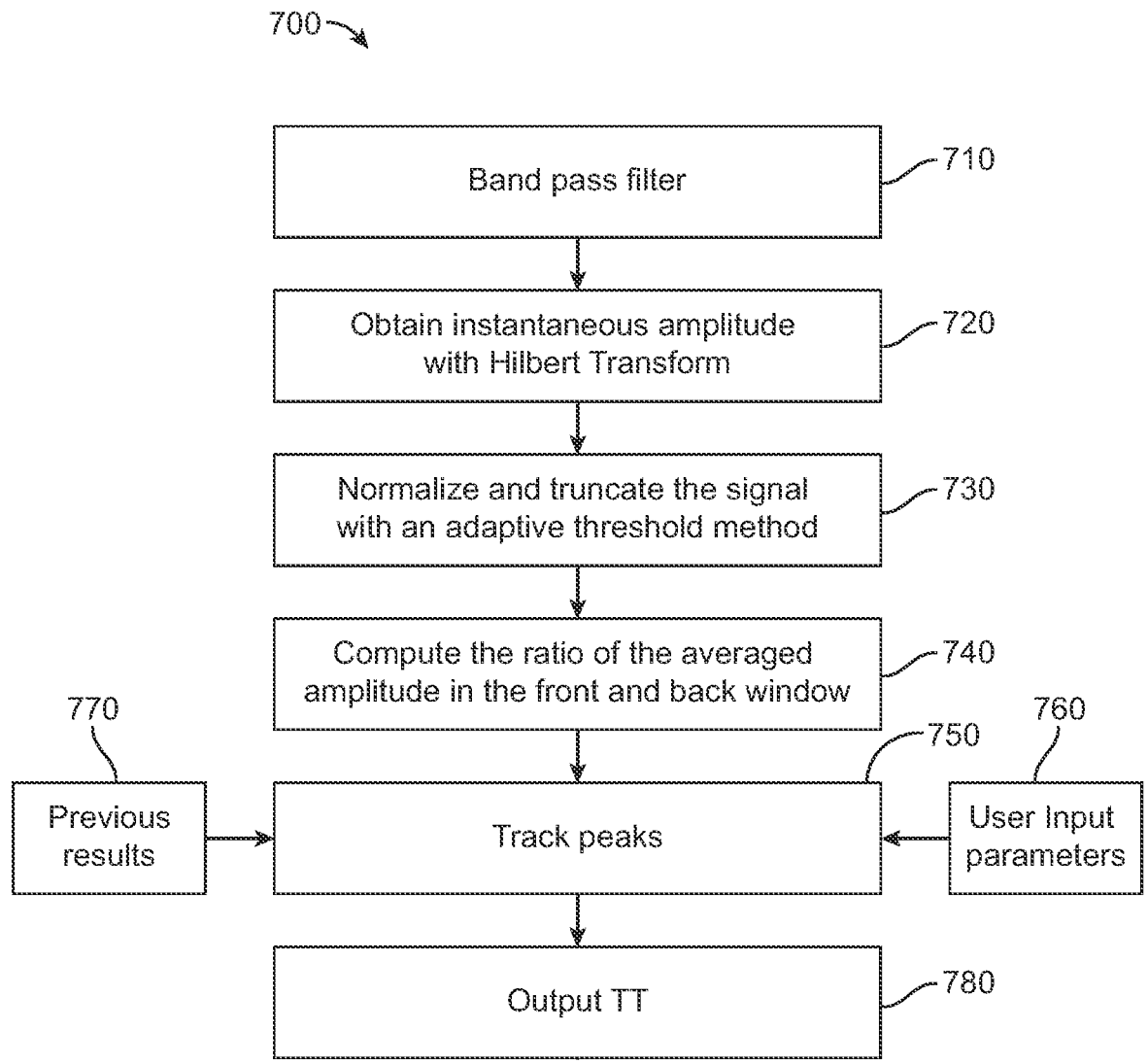
FIG. 7 illustrates an exemplary work-flow for a first-motion detection method in accordance with the present disclosure.

The first motion detection technique is a significant step in the proposed work-flow, as it provides the arrival time for P-waves, which is used to assemble the time window for the semblance calculation. Although most first motion detection methods can be used to locate the first motion in the waveforms, it is preferable to use a back/front time window amplitude ratio method to detect the first motion along each wave train. This method is provided in work flow 700 as illustrated in FIG. 7. First, as shown in step 710, a band-pass filter is applied to the waveforms to remove the high-frequency and low-frequency noise. Next, as in step 720, in order to remove or reduce of the influence of the signal phase, the instantaneous amplitude information of the waveforms is obtained by using the Hilbert Transform. From here, as shown in step 730, the instantaneous amplitude is normalized and clipped by an adaptive threshold method with an estimation of the SNR of the waveforms used to prevent the arrival time automation from occasionally jumping to later arrivals. Following this, as in step 740, the ratio of the two amplitude averages within the front and back window associated with the reference time T is then computed, and the front/back window is moved to obtain a ratio curve against the reference time T. In a step 750, the arrival time of P-waves can be estimated by tracking the maximum peaks in the ratio curve. The ratio curve may be estimated based on previous results 770 or by using user input parameters 760.

Figure 8:
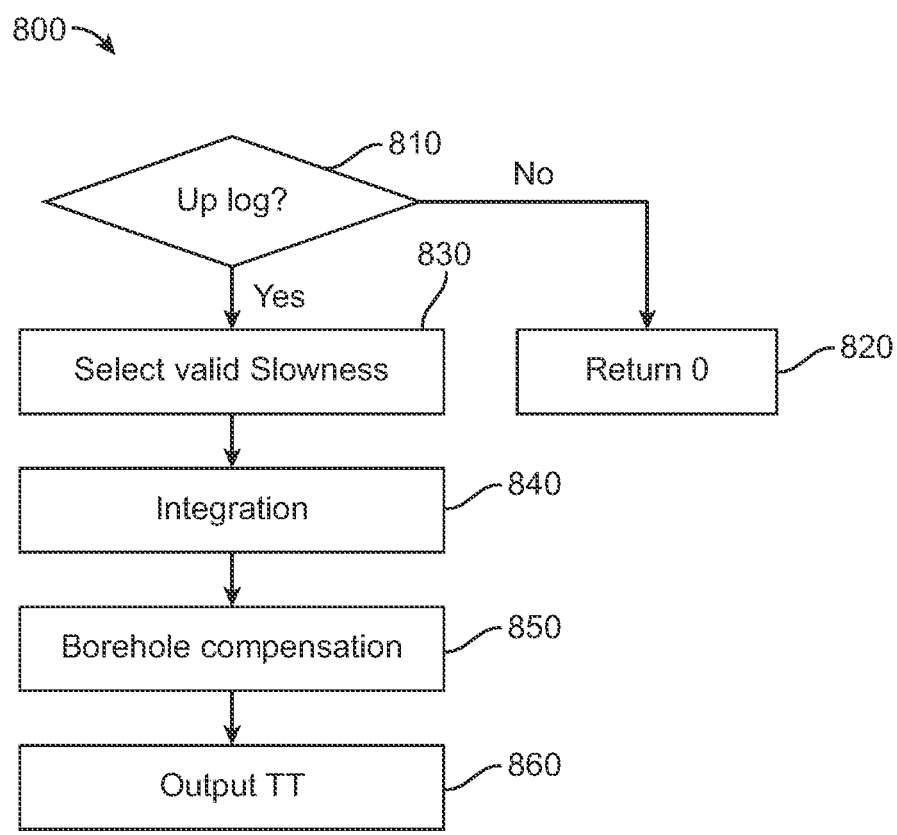
FIG. 8 illustrates an exemplary work-flow for computing the travel time of target wave mode in accordance with the present disclosure.

If the first motion detection method fails to provide the arrival time of refracted P-waves, it is possible to predict, via computation, the P-wave arrival time by integrating compressional slowness over traveling distances of the formations between the transmitter and receiver if the acoustic tool is in up logging mode. Workflow 800 illustrated in FIG. 8 shows the procedure of travel time (TT) computation from known slowness curves. Accordingly, as shown in first step 810, it is first determined if the acoustic tool is placed in an up logging mode, and if this is true, the flow proceeds to step 830 (rather than aborting or proceeding to an off as in step

820), wherein the desired slowness curve is selected (such as slowness for a compressional wave). As shown in step 840, an integration is conducted with respect to the desired slowness curve. A borehole compensation may be applied, as in step 850, to account for misalignments and varying sizes of the borehole, to arrive at the final computed travel time (TT) 860.

Figure 9:
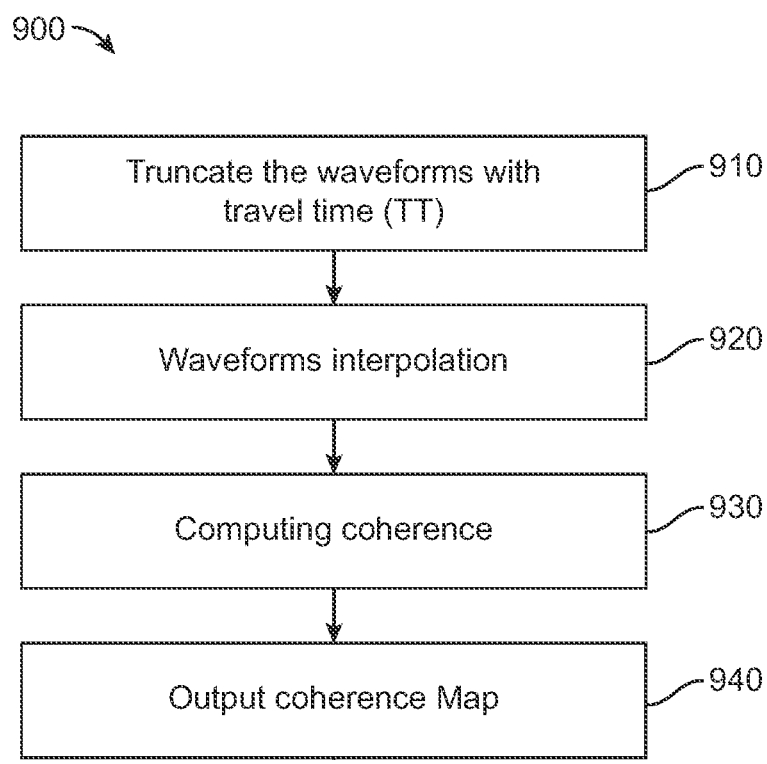
FIG. 9 illustrates an exemplary work-flow for generating a coherence map with a known travel time of target wave mode in accordance with the present disclosure.

FIG. 9 shows the work-flow 900 used to generate the 1D coherence VDL map. First, as in step 910, the waveforms are truncated after band-pass filtering the signal with the arrival time generated by the first motion detection program. Next, as in step 920, in order to refine the slowness computation gridding step in the coherence calculation process, the waveforms data are interpolated to have a smaller time sampling interval. The waveforms themselves need not be directly interpolated, but instead interpolation is used when computing the 2-D semblance calculations as this is computationally more efficient and yields the same accuracy. Finally, in step 930, the coherence map versus P-slowness is calculated and output in a step 940 for further processing, such as the slowness tracking and pick processing.

Figure 10:
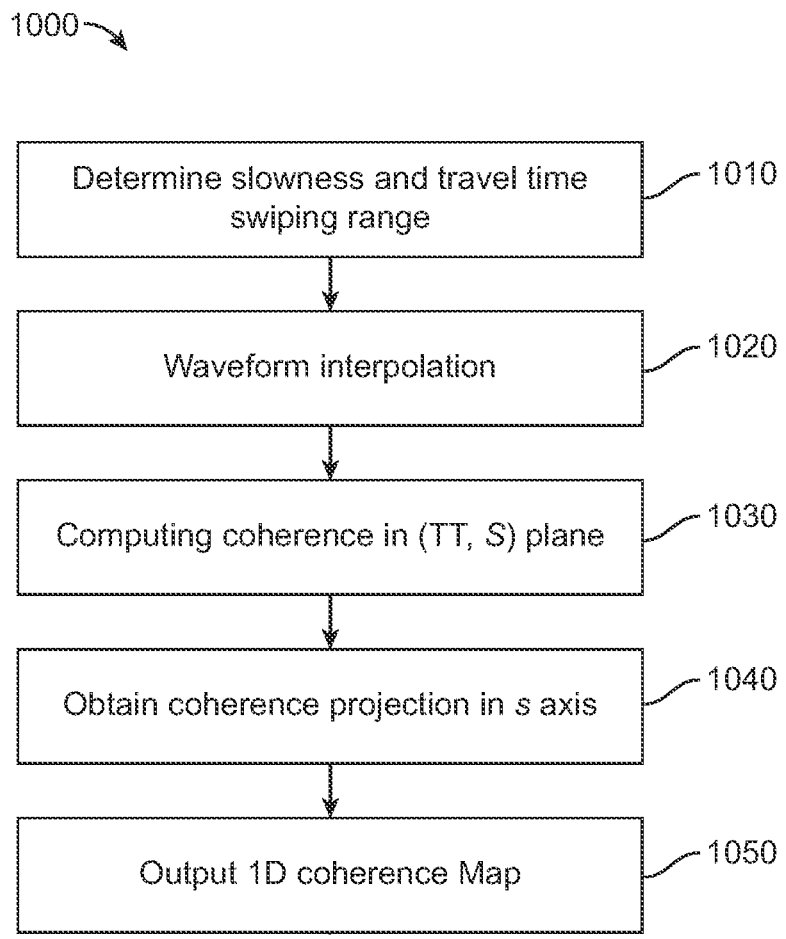
FIG. 10 illustrates an exemplary work-flow for generating a coherence map without a known travel time in accordance with the present disclosure.

If the first motion detection or the travel time computation do not provide a reliable P-wave arrival time, the method can use the full time window of the waveform for the semblance processing, as illustrated in the workflow 1000 of FIG. 10. First, as shown in step 1010, the sweeping range of slowness and travel time are first determined by a user's input parameters. Next, as shown in step 1020, the waveform interpolation process is applied to refine the time sampling intervals (or interpolation done in the semblance calculation itself). After this step, as noted in step 1040, the 2D (s,t) coherence map can be generated by any time-domain processing method.

In step 1040, during the slowness pick and track process, the 1D VDL coherence map can be obtained by taking the maximum value along the travel time axis for each slowness grid. However, it is preferable to use a weighted average across the 2D map where the detections that are long in time yield more significance than detections that have shorter temporal extent. Doing so reduces the influence of noise. As result of coherence projection, in step 1050, the 1D VDL coherence map may be output.

Next, after the 1D VDL for P-waves is obtained, the P-wave slowness can be estimated by tracking the local maximums/peaks in the 1D VDL coherence map at each depth during the logging process. Accurate estimating of P-wave slowness and/or arrival time provides critical information for finding the S-refracted shear arrivals due to the physical relationship between P and S waves.

Figure 11:
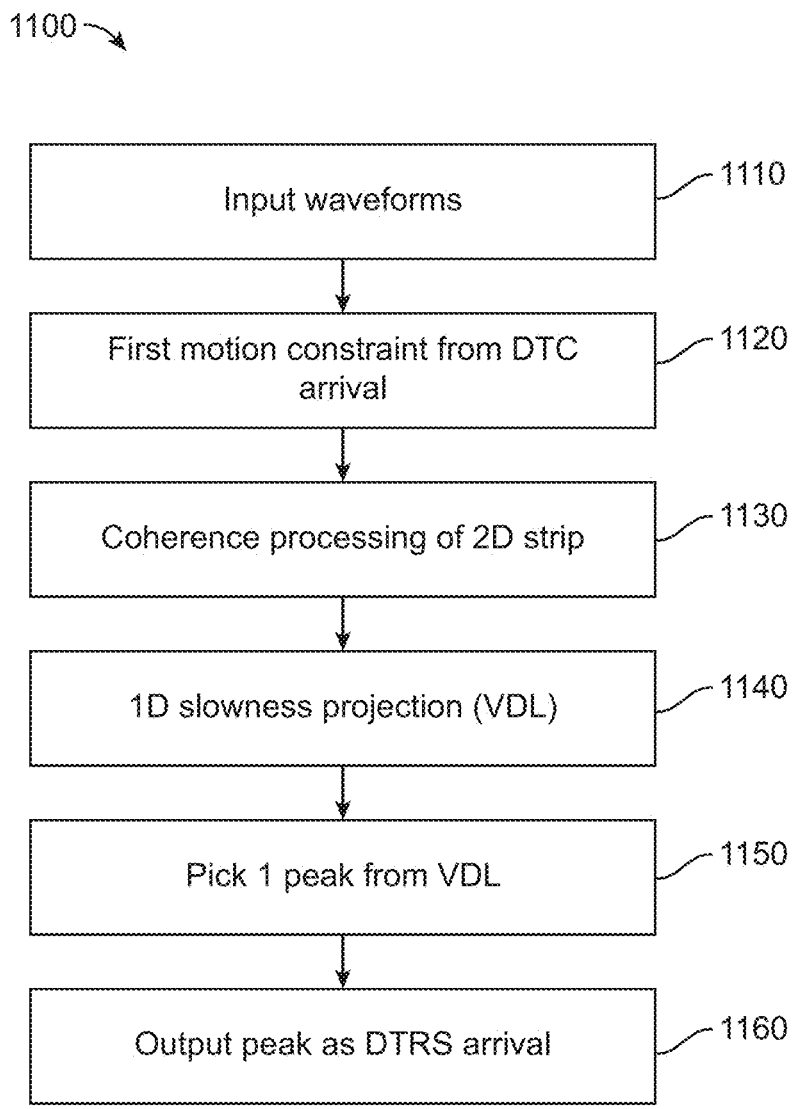
FIG. 11 illustrates an exemplary work-flow for estimating refracted shear slowness in accordance with the present disclosure.

Accordingly, FIG. 11 provides a workflow 1100 for estimating shear slowness. Initially, in step 1110, the P- and S-wave waveforms are input. As mentioned, P-wave slowness may be determined from the 1D VDL coherence map. Once P-wave slowness/travel time is obtained, as noted in step 1120, constraints may be applied from the DTC arrival. In particular, it is convenient to extract shear slowness based on the fact that, physically, the P-S slowness ratio is within a specific range, and the refracted shear waves exist in the wave trains only in the case where the shear slowness is smaller than the mud compressional slowness. Accordingly, the 2D(s,t) time semblance searching range for the refracted shear slowness can be estimated by equations (1)-(4), where DTC and DTM represent the formation compressional slowness and mud compressional slowness, respectively, TTC denotes the travel time of compressional wave, and ($s_{min}$, $s_{max}$) and ($t_{min}$, $t_{max}$) represent the searching window for borehole refracted shear slowness (DTRS).

$$s_{min} = DTC * 1.35 \quad (1)$$

$$s_{max} = DTM \quad (2)$$

$$t_{min} = TTC * 1.4 \quad (3)$$

$$t_{max} = TTC * \frac{DTM}{DTC} \quad (4)$$

From here, in step 1130 the coherence map in the 2D range can be calculated, and then as in step 1140, the coherences can be projected across time to form a 1D VDL as illustrated. All the peaks (local maximum) in the VDL will be picked, and according to step 1160, the peak that is within a reasonable slowness range and having continuous value with its neighbors will be picked as the final refracted shear slowness value. In step 1160, this peak will be output as the shear slowness (DTRS) arrival.

Figure 12:
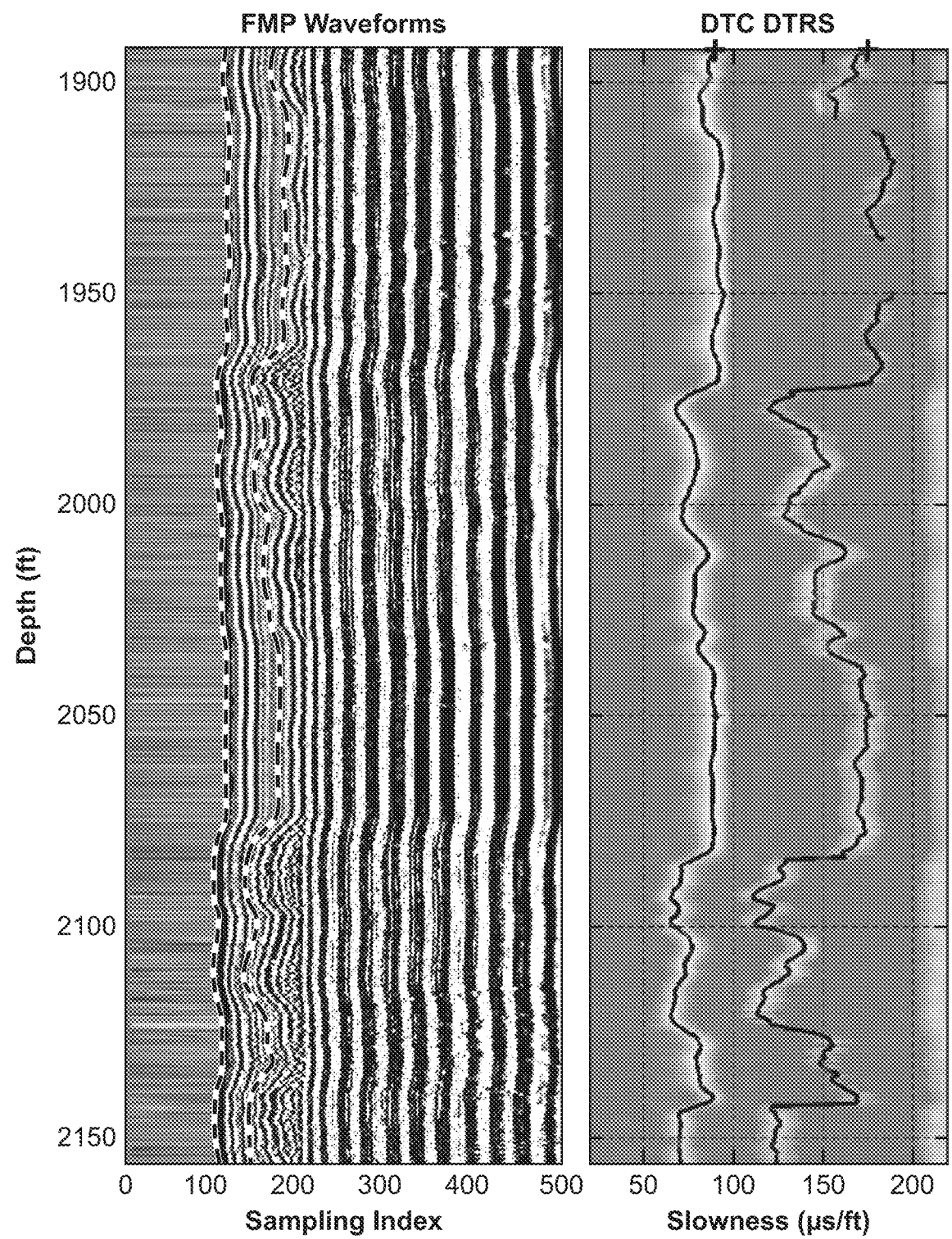
FIG. 12 is a graphical representation displaying the results generated by the present disclosure for the sonic data measured in a hard formation borehole.

FIG. 12 shows the processing results by using the method described by the present disclosure combined with DPTS, where the left plot shows the VDL of the constant offset waveforms, the arrival time curve detected by the first motion detection technique (bold solid curves), the computed compressional travel time (the far left vertical dashed curve) from measured P-slowness and the computed shear wave travel time (second vertical dashed curve from the left) from measured S-slowness. The right plot in FIG. 12 shows the coherence VDL image overlapped with P- and S-slowness curves. The results demonstrate and verify that the first motion detection technique not only accurately captures the first arrived P waves but also helps to correctly measure both the P-slowness and S-slowness by using the constraints from the first P wave arrived time. The VDL plot on the right of FIG. 12 shows a smooth and continues image, with P-slowness and S-slowness going through the peaks of the image. This suggests that both the P slowness and S slowness are confidently evaluated.

Figure 13:
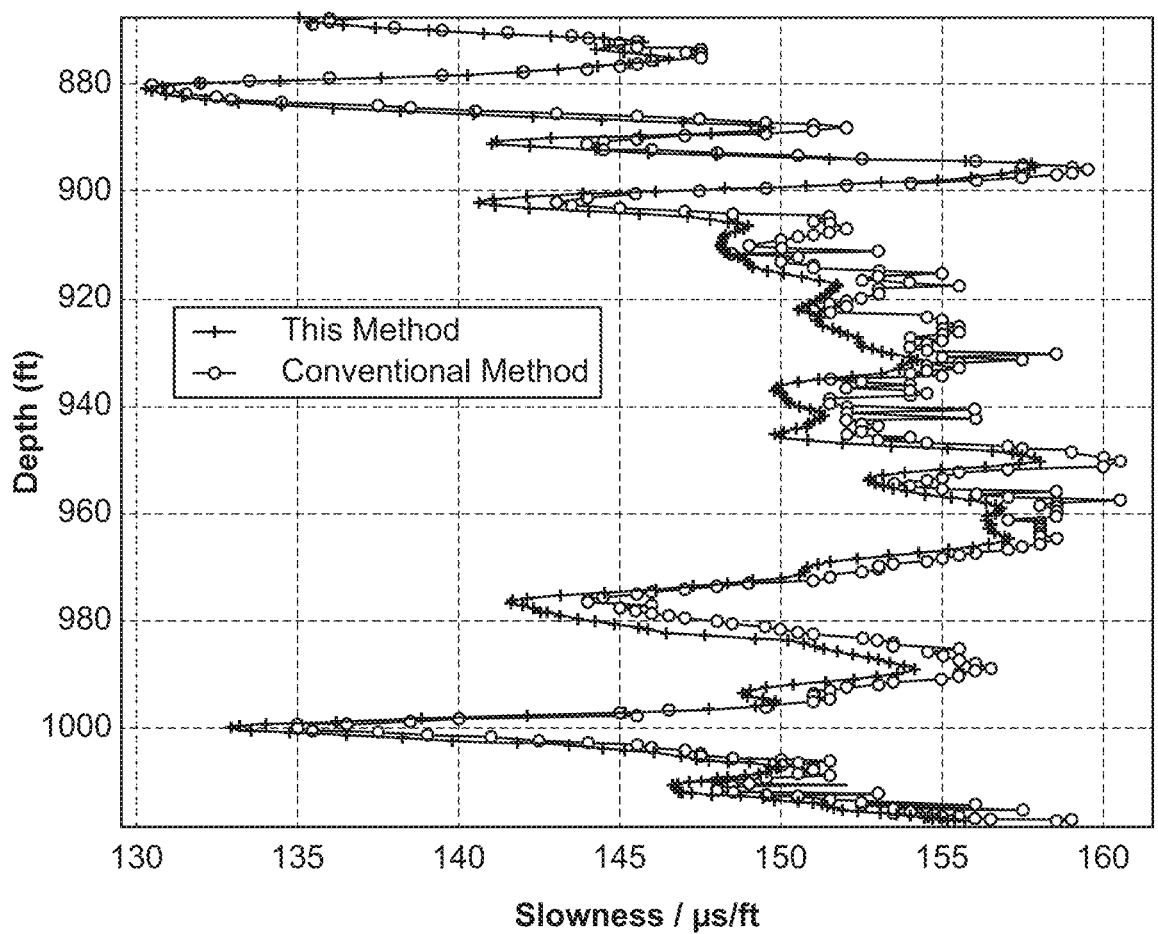
FIG. 13 is a graphical representation displaying the results generated by the present disclosure for the sonic data measured in a soft formation borehole.

FIG. 13 shows the P slowness picking result for a soft formation case in accordance with the present disclosure and its comparison to a conventional method. Due to the influence of later arrived leaky P waves, the P slowness extracted by the conventional method has a tendency to jump between the slowness of the first arrived P waves and the slowness of leaky P waves. It can be seen from FIG. 13 that the P slowness extracted by the presently disclosed method is smooth and continuous, and that the disclosed method correctly distinguishes the compressional arrival from the later-arriving leaky-P arrivals.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

STATEMENTS OF THE DISCLOSURE INCLUDE

Statement 1: A method, including: measuring, by a sonic logging tool, sonic data associated with a formation within a borehole; attempting a detection of a first arrival within the sonic data; determining whether the attempted detection of the first arrival is accurate, and in response to an accurate detection of the first arrival, determining a travel time of the first arrival based on the sonic data; generating a coherence map based on the first arrival and the travel time; and determining, based on the coherence map, a characteristic of the formation.

Statement 2: The method according to Statement 1, further including: in response to determining that the attempted detection of the first arrival is inaccurate, determining a predicted travel time of the first arrival; and generating the coherence map based on the first arrival and the predicted travel time.

Statement 3: The method according to Statement 2, further including: in response to determining the predicted travel time, truncating the sonic data based on the predicted travel time; and interpolating the truncated sonic data to generate the coherence map.

Statement 4: The method according to any one of Statements 2-3, wherein determining the predicted travel time comprises integrating slowness and travel distance between a transmitter and a receiver within the sonic logging tool.

Statement 5: The method according to any one of Statements 2-4, wherein the attempting the detection of the first arrival comprises: applying a filter to the sonic data; obtaining instantaneous amplitude information of the filtered sonic data; normalizing and clipping the instantaneous amplitude information by an adaptive threshold method with an estimation of the SNR of the filtered sonic data to prevent the arrival time automation from jumping occasionally to later arrivals; determining a ratio function between a front and a back time window of the amplitude information; and obtaining the travel time based on the ratio function.

Statement 6: The method according to any one of Statements 2-5, further including: determining whether the predicted travel time of the first arrival is accurate, and in response to determining the predicted travel time is inaccurate, generating a coherence map based on a time window longer than that of the first arrival.

Statement 7: The method according to any one of Statements 2-5, further comprising: estimating a searching window for a second characteristic of the formation based on the travel time or predicted travel time; and determining the second characteristic of the formation.

Statement 8: The method according to Statement 7 wherein the second characteristic is a refracted shear slowness (DTRS).

Statement 9: The method according to any one of Statements 1-8, wherein the first arrival is a P-wave, and wherein the characteristic is a P-slowness.

Statement 10: The method according to any one of Statements 1-9, wherein the sonic logging tool comprises a transmitter and a receiver array configured to receive a plurality of waveforms.

Statement 11: The method according to Statement 10, wherein generating a coherence map based on the first arrival comprises a time window that spans a wave energy of the first arrival.

Statement 12: The system including: a sonic logging tool having a receiver array configured to receive a plurality of waveforms; one or more processors in communication with the sonic logging tool; and at least one computer-readable storage medium having stored therein instructions which, when executed by the one or more processors, cause the one or more processors to: measure, by a sonic logging tool, sonic data associated with a formation within a borehole; attempt a detection of a first arrival within the sonic data; determine whether the attempted detection of the first arrival is accurate, and in response to an accurate detection of a first arrival, determining a travel time of the first arrival based on the sonic data; generate a coherence map based on the first arrival and the travel time; and determine, based on the coherence map, a characteristic of the formation.

Statement 13: The system according to Statement 12, the at least one computer-readable storage medium storing additional instructions which, when executed by the one or more processors, cause the one or more processors to: in response to determining that the attempted detection of the first arrival is inaccurate, determine a predicted travel time of the first arrival; and generating the coherence map based on the first arrival and the predicted travel time.

Statement 14: The system according to Statement 13, wherein determining the predicted travel time comprises integrating slowness and travel distance between a transmitter and a receiver within the sonic logging tool.

Statement 15: The system according to any one of Statements 13-14, wherein the attempted detection of the first arrival comprises: applying a filter to the sonic data; obtaining instantaneous amplitude information of the filtered sonic data; normalizing and clipping the instantaneous amplitude information by an adaptive threshold method with an estimation of the SNR of the filtered sonic data to prevent the arrival time automation from jumping occasionally to later arrivals; determining a ratio function between a front and a back time window of the amplitude information; and obtaining the travel time based on the ratio function.

Statement 16: The system according to any one of Statements 13-15: the at least one computer-readable storage medium storing additional instructions which, when executed by the one or more processors, cause the one or more processors to: estimate a searching window for a second characteristic of the formation based on the travel time; and determine the second characteristic of the formation.

Statement 17: The system according to Statement 16, wherein the second characteristic is a refracted shear slowness (DTRS).

Statement 18: The system according to any one of Statements 12-17, wherein the first arrival is a P-wave.

Statement 19: A non-transitory computer-readable storage medium including: instructions stored on the non-transitory computer-readable storage medium, the instructions, when executed by at least one processor, cause the at least one processor to: measure, by a sonic logging tool having a receiver array, sonic data associated with a formation within a borehole; attempt a detection of a first arrival within the sonic data; determine whether the attempted detection of the first arrival is accurate, and in response to an accurate detection of a first arrival, determining a travel time of the first arrival based on the sonic data; generate a coherence map based on the first arrival and the travel time; and determine, based on the coherence map, a characteristic of the formation.

Statement 20: The non-transitory computer-readable storage medium according to Statement 20, comprising additional instructions which, when executed by the one or more processors, cause the one or more processors to: in response to determining that the attempted detection of the first arrival is inaccurate, determine a predicted travel time of the first arrival; and generating the coherence map based on the first arrival and the predicted travel time.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed:

1. A method, comprising:
   measuring, by a sonic logging tool, sonic data associated with a first formation within a borehole;
   attempting to locate a first arrival of a P-wave within the sonic data;
   in response to not locating the first arrival of the P-wave, determining an arrival time of the P-wave in the first formation by integrating a slowness over a travel distance through the first formation between a transmitter and a receiver within the sonic logging tool;
   applying a borehole compensation based on the integrated slowness to determine a final computed travel time of the first arrival of the P-wave in the formation;
   generating a coherence map based on the final computed travel time;
   tracking one or more peaks along a travel time axis of the coherence map; and
   determining, based on the one or more peaks, a characteristic of the first formation.

2. The method of claim 1, wherein the P-wave is represented by one or more peaks in the coherence map.

3. The method of claim 1, further comprising:
   in response to determining the predicted travel time, truncating the sonic data based on the predicted travel time; and
   interpolating the truncated sonic data to generate the coherence map.

4. The method of claim 1, wherein the sonic logging tool is in an up logging mode.

5. The method of claim 1, wherein the attempting the detection of the first arrival comprises:
   applying a filter to the sonic data;
   obtaining instantaneous amplitude information of the filtered sonic data;
   normalizing and clipping the instantaneous amplitude information by an adaptive threshold method with an estimation of the SNR of the filtered sonic data to prevent an arrival time automation from jumping occasionally to later arrivals;
   determining a ratio function between a front and a back time window of the amplitude information; and
   obtaining the travel time based on the ratio function.

6. The method of claim 1, further comprising:
   determining whether the predicted travel time of the first arrival is accurate, and in response to determining the predicted travel time is inaccurate, generating a coherence map based on a time window longer than that of the first arrival.

7. The method of claim 1, further comprising:
   estimating a searching window for a second characteristic of the formation based on the travel time; and
   determining the second characteristic of the formation.

8. The method of claim 7, wherein the second characteristic is a refracted shear slowness (DTRS).

9. The method of claim 1, wherein the characteristic is a P-slowness.

10. The method of claim 1, wherein the sonic logging tool comprises a transmitter and a receiver array configured to receive a plurality of waveforms.

11. The method of claim 1, wherein generating the coherence map based on the first arrival comprises generating the coherence map based on a time window that spans a wave energy of the first arrival.

12. A system comprising:
   a sonic logging tool having a receiver array configured to receive a plurality of waveforms;
   one or more processors in communication with the sonic logging tool; and
   at least one computer-readable storage medium having stored therein instructions which, when executed by the one or more processors, cause the one or more processors to:
      measure, by the sonic logging tool, sonic data associated with a first formation within a borehole;
      attempt to locate a first arrival of a P-wave within the sonic data;
      in response to not locating the first arrival of the P-wave, determine an arrival time of the P-wave in the first formation by integrating a slowness over a travel distance through the first formation between a transmitter and a receiver within the sonic logging tool;

apply a borehole compensation based on the integrated slowness to determine a final computed travel time of the first arrival of the P-wave in the formation;

generate a coherence map based on the final computed travel time;

tracking one or more peaks along a travel time axis of the coherence map; and determine, based on the one or more peaks, a characteristic of the first formation.

13. The system of claim 12, wherein the P-wave is represented by one or more peaks in the coherence map.

14. The system of claim 12, wherein the sonic logging tool is in an up logging mode.

15. The system of claim 12, wherein the attempted detection of the first arrival comprises:

applying a filter to the sonic data;

obtaining instantaneous amplitude information of the filtered sonic data;

normalizing and clipping the instantaneous amplitude information by an adaptive threshold method with an estimation of the SNR of the filtered sonic data to prevent an arrival time automation from jumping occasionally to later arrivals;

determining a ratio function between a front and a back time window of the amplitude information; and obtaining the travel time based on the ratio function.

16. The system of claim 12, the at least one computer-readable storage medium storing additional instructions which, when executed by the one or more processors, cause the one or more processors to:

estimate a searching window for a second characteristic of the formation based on the travel time; and determine the second characteristic of the formation.

17. The system of claim 16, wherein the second characteristic is a refracted shear slowness (DTRS).

18. The system of claim 12, wherein the characteristic is a P-slowness.

19. A non-transitory computer-readable storage medium comprising:

instructions stored on the non-transitory computer-readable storage medium, the instructions, when executed by at least one processor, cause the at least one processor to:

measure, by a sonic logging tool having a receiver array, sonic data associated with a first formation within a borehole;

attempt to locate a first arrival of a P-wave within the sonic data;

in response to not locating the first arrival of the P-wave, determine an arrival time of the P-wave in the first formation by integrating a slowness over a travel distance through the first formation between a transmitter and a receiver within the sonic logging tool;

apply a borehole compensation based on the integrated slowness to determine a final computed travel time of the first arrival of the P-wave in the formation;

generate a coherence map based on the final computed travel time;

track one or more peaks along a travel time axis of the coherence map; and determine, based on the one or more peaks, a characteristic of the first formation.

20. The non-transitory computer-readable storage medium of claim 19, wherein the sonic logging tool is in an up logging mode.

* * * * *